(12) United States Patent
Steyskal et al.

(10) Patent No.: US 7,218,504 B2
(45) Date of Patent: May 15, 2007

(54) CAPACITOR DEVICE AND METHOD

(75) Inventors: Aaron J. Steyskal, Portland, OR (US); Larry E. Mosley, Santa Clara, CA (US); Tony V. Tran, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 10/792,257

(22) Filed: Mar. 2, 2004

(65) Prior Publication Data

US 2005/0195555 A1  Sep. 8, 2005

(51) Int. Cl.
*H01G 4/228* (2006.01)

(52) U.S. Cl. .................. 361/306.3; 361/302; 361/303; 361/306.1; 361/321.2; 361/313

(58) Field of Classification Search ........ 361/302–303, 361/306.1, 306.3, 306.5, 308.1, 311–313, 361/321.1, 321.5, 301.1, 301.3, 582, 523, 361/308.3, 321.2, 328, 310, 306.2
See application file for complete search history.

(56) References Cited

U.S. PATENT DOCUMENTS

| | | | | |
|---|---|---|---|---|
| 5,880,925 A * | 3/1999 | DuPre et al. | ............... | 361/303 |
| 5,889,647 A * | 3/1999 | Hansen et al. | ............... | 361/311 |
| 6,185,091 B1 | 2/2001 | Tanahashi et al. | ......... | 361/524 |
| 6,351,369 B1 * | 2/2002 | Kuroda et al. | ........... | 361/306.3 |
| 6,421,227 B2 * | 7/2002 | Nitoh et al. | ................ | 361/523 |
| 6,462,933 B2 * | 10/2002 | Takeshima et al. | ...... | 361/306.3 |
| 6,549,395 B1 * | 4/2003 | Naito et al. | .............. | 361/306.1 |
| 6,590,762 B2 * | 7/2003 | Greenwood et al. | ........ | 361/523 |
| 6,594,136 B2 * | 7/2003 | Kuroda et al. | ........... | 361/306.1 |
| 6,606,237 B1 * | 8/2003 | Naito et al. | .............. | 361/306.3 |
| 6,751,087 B2 * | 6/2004 | Greenwood et al. | ........ | 361/533 |
| 6,795,295 B2 * | 9/2004 | Murakami et al. | ....... | 361/306.3 |
| 6,795,296 B1 * | 9/2004 | Palanduz et al. | ........... | 361/311 |

OTHER PUBLICATIONS

"Panasonic Technical Guide: Specialty Polymer Aluminum Electrolytic Capacitors (Ap-Al)", Available from www.panasonic.com/industrial/components/pdf/sp_prod_outline.pdf, 12.

* cited by examiner

*Primary Examiner*—Nguyen T. Ha
(74) *Attorney, Agent, or Firm*—Schwegman, Lundberg, Woessner & Kluth, P.A.

(57) ABSTRACT

A capacitor with reduced equivalent series resistance and reduces equivalent series inductance is provided. Capacitors are provided with multiple plate assemblies that couple to a common single first polarity terminal. Capacitors are also provided with multiple plate assemblies that each couple to a respective second polarity terminal. Fan-like plate assemblies are arranged to provide increased capacitance with reduced equivalent series resistance and reduces equivalent series inductance. Capacitors are provided that mount using surface mounting technology. Capacitors are provided that conform to existing capacitor form factors.

9 Claims, 9 Drawing Sheets

CAPACITOR DEVICE AND METHOD

BACKGROUND

Electrical circuits often include capacitors for various purposes such as filtering, bypassing, power decoupling, and to perform other functions. Although a computer application is used below as an example, the invention is not so limited. In one computer application example, high-speed digital integrated circuits such as processors and computer chipsets in particular typically perform best when the power supplied to the integrated circuit is filtered with a capacitor placed physically close to the integrated circuit.

Such power decoupling capacitors function to smooth out irregularities in the voltage supplied to the integrated circuits, and so serve to provide the integrated circuits with a more ideal voltage supply.

By placing the decoupling capacitors near the integrated circuit, parasitic impedances such as printed circuit board path resistance or inductance are minimized, allowing easy and efficient transfer of energy from the decoupling capacitor to the integrated circuit. Reduction of series resistance and inductance in the capacitor itself is also desirable for the same purposes, and results in a more efficient decoupling or bypass capacitor.

The internal series resistance of the capacitor is typically known as the Equivalent Series Resistance, or ESR. Similarly, internal series inductance is known as Equivalent Series Inductance, or ESL. Both of these parameters can be measured for a given capacitor, and are among the basic criteria used to select capacitors for applications such as integrated circuit power supply decoupling.

Past efforts to minimize ESL and ESR have included solutions such as using multiple types of capacitors in parallel or combination series-parallel configurations, configured to produce the desired capacitance at low ESR and ESL levels. For example, tantalum capacitors in the order of 4.7 uF in parallel with 0.01 uF ceramic chip capacitors were often sufficient for lower-speed digital logic circuits of previous decades. But, new high speed digital logic circuits such as high-performance computer processors require both greater capacitance because of the amount of power dissipated, and lower ESR and ESL because of the very high speeds at which the processors operate.

It is also desirable for capacitors to have a physically small size, so that they do not take an unduly large amount of printed circuit board space. This is why space efficient capacitor technologies such as tantalum and electrolytic capacitors are often implemented in circuits despite typically having relatively high inductance, resistance, dielectric absorption, and other unfavorable characteristics.

DETAILED DESCRIPTION

In the following detailed description of the invention reference is made to the accompanying drawings which form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized, and structural, logical, and electrical changes may be made, without departing from the scope of the present invention. The following detailed description is, therefore, not to be taken in a limiting sense, and the scope of the invention should be determined with reference to the appended claims, along with the full scope of equivalents to which such claims are entitled.

Relative direction terms as used in this description are defined with reference to the conventional horizontal, large plane or surface of a board, such as a motherboard, where electrical components have typically been attached, regardless of the orientation of the board. Likewise, when referring to components that are adapted for use on circuit boards, terms such as "top surface" or "bottom surface" are defined as surfaces of components that are substantially parallel to the conventional horizontal, large plane or surface of the board. The term "vertical" refers to a direction perpendicular to the horizontal as defined above.

An example of an information handling system is included to show an example of a higher level device application for the present invention. In one embodiment, a capacitor according to one embodiment of the invention is included in an information handling system as described below. In one embodiment, the capacitor is used in a voltage regulator circuit.

Figure 1:
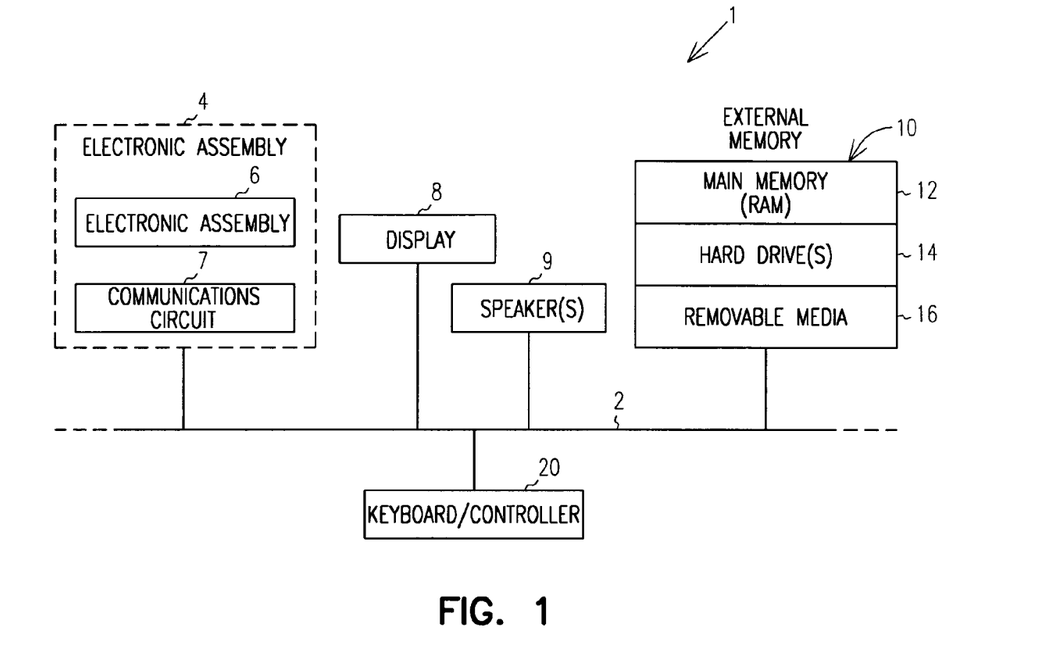
FIG. 1 illustrates an information handling system including a capacitor according to an embodiment of the invention.

FIG. 1 is a block diagram of an information handling system 1 incorporating at least one capacitor in accordance with at least one embodiment of the invention. Information handling system 1 is merely one example of an electronic system in which the present invention can be used. In this example, information handling system 1 comprises a data processing system that includes a system bus 2 to couple the various components of the system. System bus 2 provides communications links among the various components of the information handling system 1 and can be implemented as a single bus, as a combination of busses, or in any other suitable manner.

Electronic assembly 4 is coupled to system bus 2. Electronic assembly 4 can include any circuit or combination of circuits. In one embodiment, electronic assembly 4 includes a processor 6 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit.

Other types of circuits that can be included in electronic assembly 4 are a custom circuit, an application-specific integrated circuit (ASIC), or the like, such as, for example, one or more circuits (such as a communications circuit 7) for use in wireless devices like cellular telephones, pagers, portable computers, two-way radios, and similar electronic systems. The IC can perform any other type of function. In one embodiment, one or more circuits and components are located on a board such as a motherboard (not shown).

Information handling system 1 can also include an external memory 10, which in turn can include one or more memory elements suitable to the particular application, such as a main memory 12 in the form of random access memory (RAM), one or more hard drives 14, and/or one or more drives that handle removable media 16 such as floppy diskettes, compact disks (CD), digital video disk (DVD), and the like. Examples of main memory 12 include dynamic random access memory (DRAM), synchronous dynamic random access memory (SDRAM), double data rate synchronous dynamic random access memory (DDR SDRAM), rambus dynamic random access memory (RDRAM), flash memory, static random access memory (SRAM), etc.

Information handling system 1 can also include a display device 8, one or more speakers 9, and a keyboard and/or controller 20, which can include a mouse, trackball, game controller, voice-recognition device, or any other device that permits a system user to input information into and receive information from the information handling system 1.

Figure 2A:
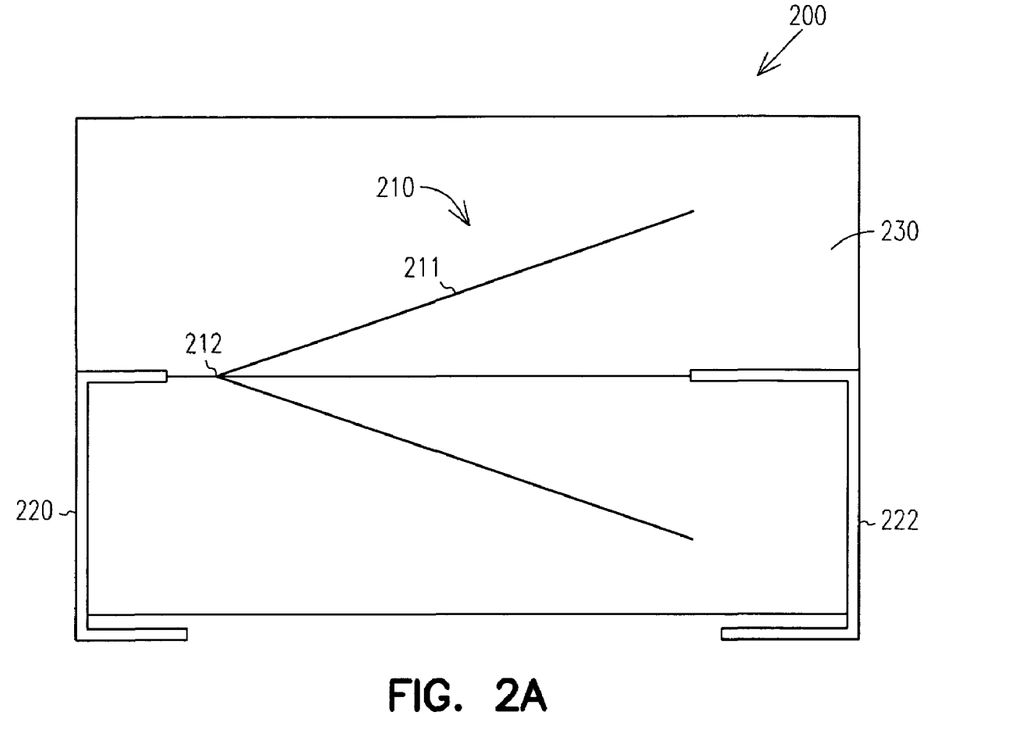
FIG. 2A illustrates a capacitor according to an embodiment of the invention.

FIG. 2A shows a capacitor 200. The capacitor 200 includes a plate assembly 210 having a number of plates 211 that are each joined at an end 212. In one embodiment, the number of plates 211 are joined using a weld. Other joining methods that provide a conductive joint, such as soldering, or conductive adhesives, etc. are within the scope of the invention. The capacitor 200 also includes a first terminal 220 and a second terminal 222. In one embodiment, the first terminal is coupled to a first polarity connection of the plate assembly 210. In one embodiment, the second terminal 222 is coupled to a second polarity connection of the plate assembly 210. In one embodiment, the first polarity connection is an anode connection and the second polarity connection is a cathode connection. The capacitor 200 further includes a capacitor package 230. In one embodiment, the capacitor package 230 includes a molded or cast polymer material. Suitable materials include, but are not limited to, epoxies, other thermoset materials, etc.

Figure 2B:
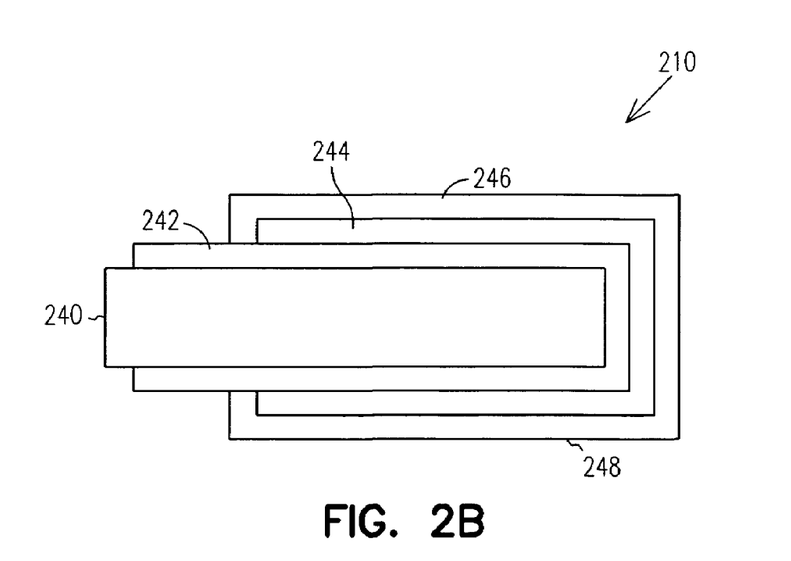
FIG. 2B illustrates a plate according to an embodiment of the invention.

FIG. 2B shows a diagram of one embodiment of an individual plate such as plate 211 from FIG. 2A. A conductive plate 240 is shown in FIG. 2B. In one embodiment, the conductive plate 240 includes aluminum metal. In one embodiment, the conductive plate 240 is an aluminum foil. In one embodiment, the conductive plate is etched or patterned on at least a portion of its surface to increase surface area. A dielectric material 242 is shown over the conductive plate. In one embodiment, the dielectric material 242 includes a metal oxide layer. In one embodiment, the dielectric material 242 is formed by oxidizing the conductive plate 240. In one embodiment, the dielectric material 242 includes aluminum oxide ($Al_2O_3$). A conductive polymer layer 244 is included over the dielectric material 242. In one embodiment, the conductive polymer 244 is formed by introducing a monomer layer to the dielectric material 242 and subsequently polymerizing the monomer layer. A conducting layer 246 is included over the conductive polymer 244 in one embodiment. In one embodiment, the conducting layer 246 includes a carbon layer. Also shown in FIG. 2B is an outer conducting layer 248. In one embodiment, the outer conducting layer 248 includes a good conductor such as a metal. In one embodiment, the outer conducting layer 248 includes a silver paint layer.

Figure 3A:
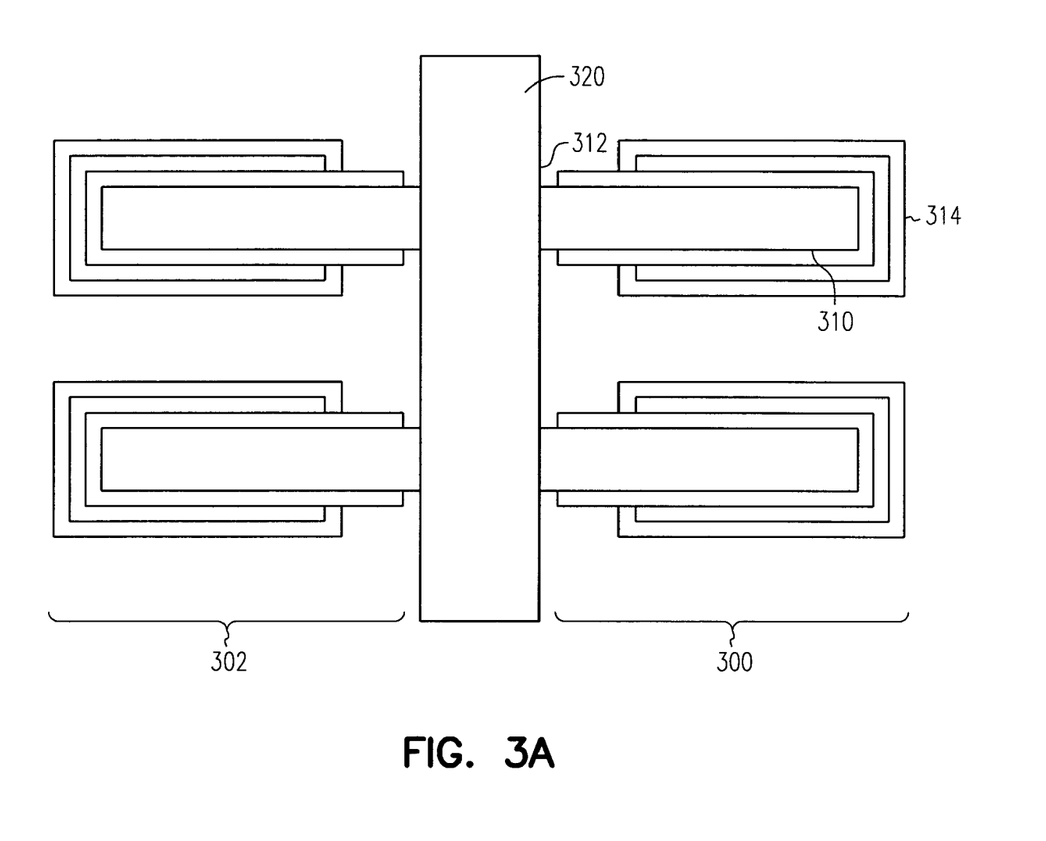
FIG. 3A illustrates an assembly for a capacitor according to an embodiment of the invention.

FIG. 3A shows a first plate assembly 300 and a second plate assembly 302 according to an embodiment of the invention. A number of individual plates 310 are shown, with a connecting structure 320. The number of plates 310 each include a first polar connection 312 and a second polar connection 314. The two polar connections 312 and 314 are separated by a dielectric layer similar to the configuration described above, to form a basic capacitive structure for each individual plate 310. In one embodiment, the first polar connection 312 is an anode connection, and the anode connections of a plurality of plates 310 are coupled together by the connecting structure 320.

Figure 3B:
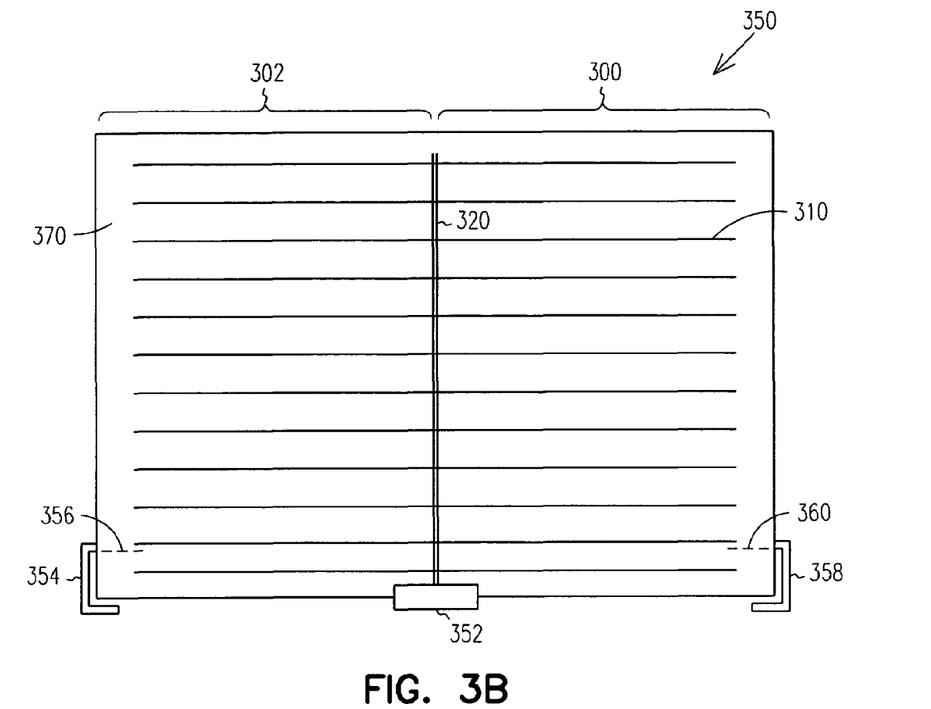
FIG. 3B illustrates a capacitor according to an embodiment of the invention.

FIG. 3B shows a capacitor 350. The capacitor 350 incorporates embodiments of the first plate assembly 300 and the second plate assembly 302 from FIG. 3A. A first terminal 352 is shown coupled to the connecting structure 320. A second terminal 354 is shown coupled to the second plate assembly 302 at the second polar connection 314 through conductor 356. One of ordinary skill in the art having the benefit of the present disclosure will recognize that although the second terminal 354 is shown coupled to a distal end of an individual plate 310, coupling at the distal end of the plate 310 is not required. As shown in Figures and discussed above, in one embodiment, substantially all of an outer surface of the plates 310 defines one plate of a capacitor. Several locations are therefore possible for coupling the second terminal to the plates 310. Likewise, a third terminal 358 is shown in FIG. 3B. In one embodiment, the third terminal 358 is coupled to a second polar connection 314 of the first plate assembly 300 through conductor 360. A capacitor package 370 is shown containing the components of the capacitor 350.

As shown in FIG. 3B, multiple plate assemblies are coupled to the common first terminal 354 at their respective first polar connections, while each individual plate assembly is coupled to a separate terminal at their second polar connections. This configuration has been found to provide high capacitance capability for a capacitor, while reducing ESL and ESR for the capacitor.

Figure 4:
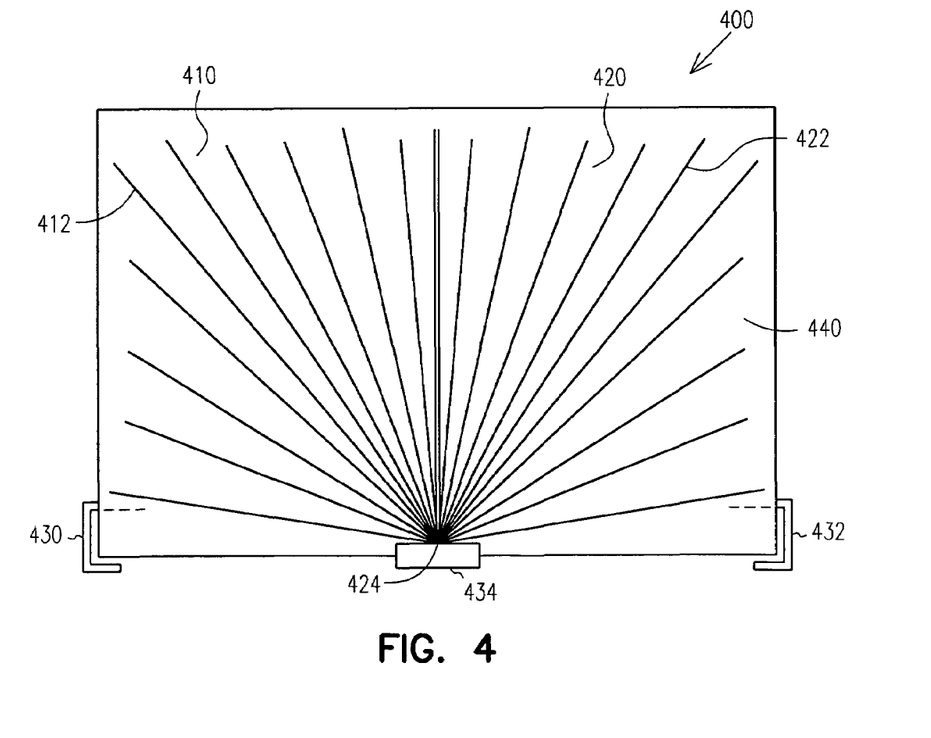
FIG. 4 illustrates another capacitor according to an embodiment of the invention.

Another embodiment of a capacitor 400 is shown in FIG. 4. FIG. 4 shows a first plate assembly 410 and a second plate assembly 420. The first plate assembly 410 includes a number of individual plates 412 similar to plates described above. In one embodiment, the plates 412 each include an aluminum foil with a metal oxide dielectric layer and a conductive polymer layer over the dielectric layer. Likewise, the second plate assembly 420 includes a number of individual plates 422 similar to plates described above. In one embodiment, the plates 422 each include an aluminum foil with a metal oxide dielectric layer and a conductive polymer layer over the dielectric layer.

The first plate assembly 410 and the second plate assembly 420 are coupled together in a fan-like arrangement at location 424. In one embodiment, the first plate assembly 410 and the second plate assembly 420 are welded together, although other methods of electrically joining the first plate assembly 410 and the second plate assembly 420 are within the scope of the invention. In one embodiment, the first plate assembly 410 and the second plate assembly 420 are joined together at an anode connection and further coupled to a first terminal 434. In one embodiment, the first plate assembly 410 is coupled to a second terminal 430 at a cathode connection of the first plate assembly 410. In one embodiment, the second plate assembly 420 is coupled to a third terminal 432 at a cathode connection of the second plate assembly 420.

Although two plate assemblies are shown in FIG. 4, the invention is not so limited. In one embodiment, three or more plate assemblies are included in a capacitor package 440. Further, in one embodiment as shown in FIG. 4, individual plates from plate assemblies vary in length to fill a space of the capacitor package 440 and to increase surface area of plates within the capacitor package 440. In one embodiment, the plates are all the same length.

Similar to embodiments shown above, in FIG. 4, multiple plate assemblies are coupled to the common first terminal 354 at their respective first polar connections, while each individual plate assembly is coupled to a separate terminal at their second polar connections. This configuration has been found to provide high capacitance capability for a capacitor, while reducing ESL and ESR for the capacitor. The fan like arrangement shown in FIG. 4 in particular, has been shown to reduce ESL and ESR for the capacitor 400.

FIGS. 5A–5D show a number of terminal configurations that can be used in embodiments of capacitors in the present disclosure. In one embodiment, at least one terminal includes a surface mount terminal designed for soldering or similar surface mount technology attachment to a circuit board. In one embodiment, all terminals are surface mount terminals.

Figure 5A:
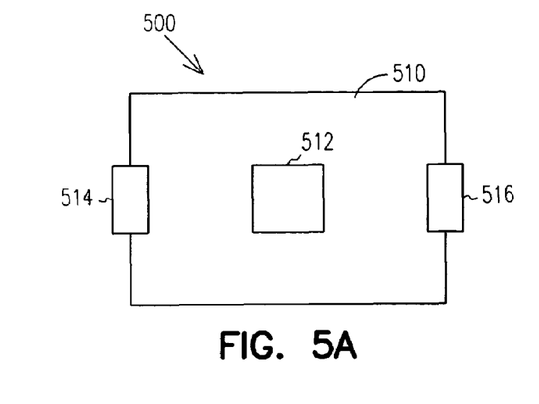
FIG. 5A illustrates a capacitor according to an embodiment of the invention.

FIG. 5A shows a bottom of a capacitor 500. A capacitor package 510 is shown housing plate assemblies as described in embodiments above. A first terminal 512, a second terminal 514 and a third terminal 516 are shown. In one embodiment, the first terminal 512 is coupled to multiple plate assemblies. In one embodiment, the second terminal 514 is coupled to one of a number of multiple plate assemblies. In one embodiment, the third terminal 516 is coupled to one of a number of multiple plate assemblies. In one embodiment, the first terminal 512 is coupled to anodes from multiple plate assemblies. In one embodiment, the second terminal 514 and the third terminal 516 are coupled to cathodes from multiple plate assemblies.

Figure 5B:
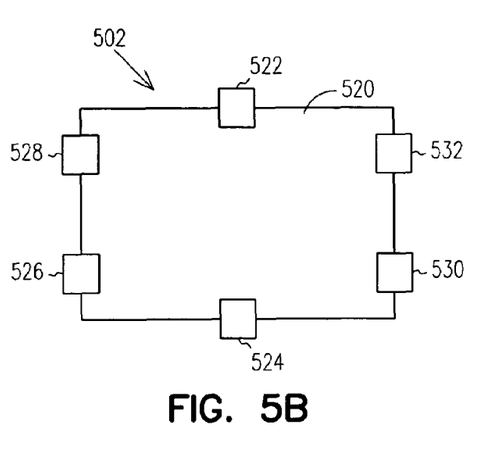
FIG. 5B illustrates a capacitor according to an embodiment of the invention.

FIG. 5B shows a bottom of a capacitor 502. A capacitor package 520 is shown housing plate assemblies as described in embodiments above. A first terminal 522, a second terminal 524, a third terminal 526, a fourth terminal 528, a fifth terminal 530 and a sixth terminal 532 are shown. In one embodiment, the first terminal 522 and the second terminal 524 are each coupled to multiple plate assemblies. In one embodiment, the third terminal 526 and the fourth terminal 528 are coupled to one of a number of multiple plate assemblies. In one embodiment, the fifth terminal 530 and the sixth terminal 532 are coupled to one of a number of multiple plate assemblies. In one embodiment, the first terminal 522 and the second terminal 524 are coupled to anodes from multiple plate assemblies. In one embodiment, the third terminal 526, the fourth terminal 528, the fifth terminal 530 and the sixth terminal 532 are coupled to cathodes from multiple plate assemblies.

Figure 5C:
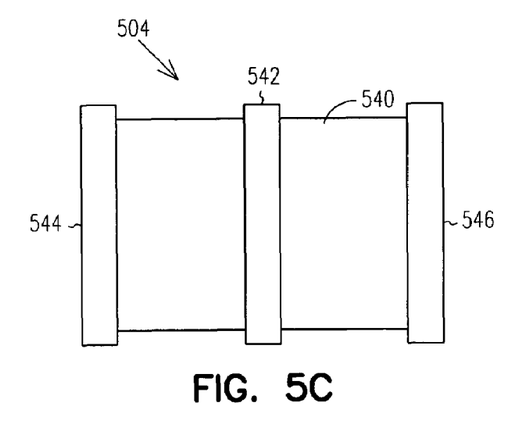
FIG. 5C illustrates a capacitor according to an embodiment of the invention.

FIG. 5C shows a bottom of a capacitor 504. A capacitor package 540 is shown housing plate assemblies as described in embodiments above. A first terminal 542, a second terminal 544 and a third terminal 546 are shown. In one embodiment, the first terminal 542 is coupled to multiple plate assemblies. In one embodiment, the second terminal 544 is coupled to one of a number of multiple plate assemblies. In one embodiment, the third terminal 546 is coupled to one of a number of multiple plate assemblies. In one embodiment, the first terminal 542 is coupled to anodes from multiple plate assemblies. In one embodiment, the second terminal 544 and the third terminal 546 are coupled to cathodes from multiple plate assemblies. As shown in FIG. 5C, in one embodiment, the terminals span a width of the capacitor package 540.

Figure 5D:
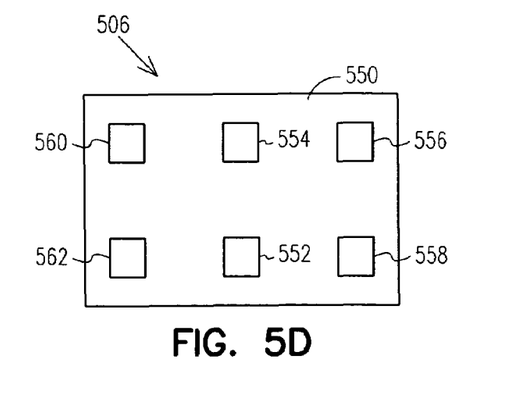
FIG. 5D illustrates a capacitor according to an embodiment of the invention.

FIG. 5D shows a bottom of a capacitor 506. A capacitor package 550 is shown housing plate assemblies as described in embodiments above. A first terminal 552, a second terminal 554, a third terminal 556, a fourth terminal 558, a fifth terminal 560 and a sixth terminal 562 are shown. In one embodiment, the first terminal 552 and the second terminal 554 are each coupled to multiple plate assemblies. In one embodiment, the third terminal 556 and the fourth terminal 558 are coupled to one of a number of multiple plate assemblies. In one embodiment, the fifth terminal 560 and the sixth terminal 562 are coupled to one of a number of multiple plate assemblies. In one embodiment, the first terminal 552 and the second terminal 554 are coupled to anodes from multiple plate assemblies. In one embodiment, the third terminal 556, the fourth terminal 558, the fifth terminal 560 and the sixth terminal 562 are coupled to cathodes from multiple plate assemblies.

Similar to embodiments shown above, in FIGS. 5A–5D, multiple plate assemblies are coupled to at least one common terminal at first polar connections, while each individual plate assembly is coupled to at least one separate terminal at second polar connections. This configuration has been found to provide high capacitance capability for a capacitor, while reducing ESL and ESR for the capacitor.

Figure 6A:
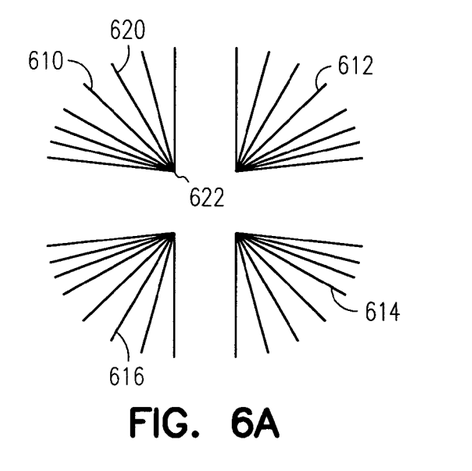
FIG. 6A illustrates a number of plate assemblies according to an embodiment of the invention.

FIGS. 6A–6D show a number of configurations of plate assemblies for use in capacitors in embodiments of the present disclosures. FIG. 6A shows a first fan-like plate assembly 610, a second fan-like plate assembly 612, a third fan-like plate assembly 614, and a fourth fan-like plate assembly 616. Similar to embodiments described above, the plate assemblies include individual plates 620. In one embodiment, the individual plates 620 include an aluminum foil with a metal oxide dielectric layer and a conductive polymer layer over the dielectric layer. In one embodiment, individual plates in each of the plate assemblies are coupled together at an end 622. In one embodiment, the end 622 couples an anode of the plates 620. Plate assemblies as shown in FIG. 6A are coupled together into a single capacitor in configurations described below. In one embodiment, the plate assemblies form a cylinder shape as shown in FIG. 6E.

Figure 6B:
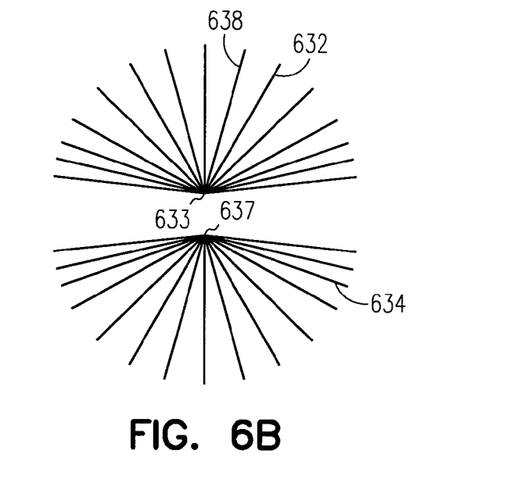
FIG. 6B illustrates a number of plate assemblies according to an embodiment of the invention.

FIG. 6B shows first fan-like plate assembly 632 and a second fan-like plate assembly 634. In contrast to FIG. 6A, the fan-like plate assemblies in FIG. 6B are each half cylinders where the fan-like plate assemblies in FIG. 6A are quarter cylinders. Similar to embodiments described above, the plate assemblies include individual plates 630. In one embodiment, the individual plates 630 include an aluminum foil with a metal oxide dielectric layer and a conductive polymer layer over the dielectric layer. In one embodiment, individual plates in each of the plate assemblies are coupled together at ends 633 and 637 respectively. In one embodiment, the ends 633 and 637 couple anodes of the plates 620 in each plate assembly 632 and 634.

Figure 6C:
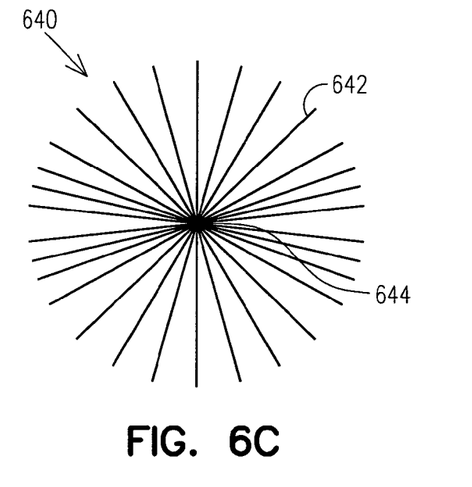
FIG. 6C illustrates a plate assembly according to an embodiment of the invention.

FIG. 6C shows another embodiment of a plate assembly 640 according to an embodiment of the invention. The plate assembly 640 includes individual plates 642. In one embodiment, the individual plates 642 include an aluminum foil with a metal oxide dielectric layer and a conductive polymer layer over the dielectric layer. In one embodiment, individual plates in each of the plate assemblies are coupled together at an end 644. In one embodiment, the end 644 couples an anode of the plates 642. In one embodiment, a single plate assembly 640 forms a cylinder shape.

Figure 6D:
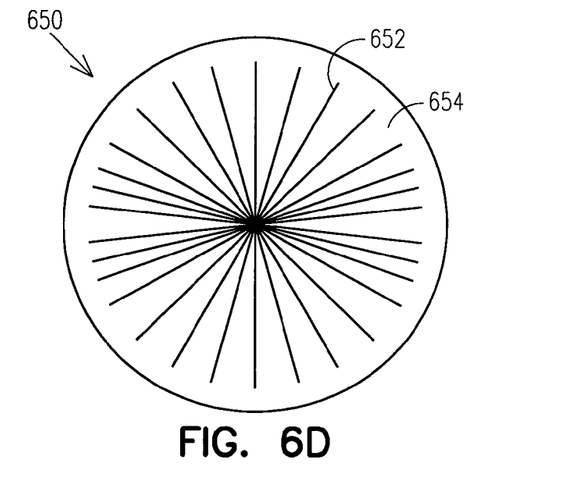
FIG. 6D illustrates a capacitor according to an embodiment of the invention.
Figure 6E:
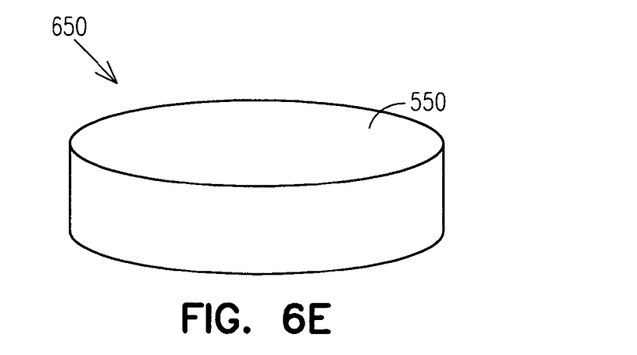
FIG. 6E illustrates a capacitor according to an embodiment of the invention.

FIG. 6D shows a capacitor 650 incorporating embodiments of multiple plate assemblies or single plate assemblies as described in embodiments above. A capacitor package 654 is shown housing the plate assemblies to form a cylindrical capacitor 650. FIG. 6E further shows the capacitor 650 with cylindrical capacitor package 654.

Fan like plate assemblies as described above have been shown to provide high capacitance while reducing ESL and ESR. Multiple plate assemblies used in a single capacitor package are useful to provide high capacitance using smaller fan-like plate assemblies that are more manufacturable than plate assemblies with large numbers of individual plates. Further plate assemblies mounted in a vertical fashion with respect to a circuit board have been found to provide high capacitance, within a small volume.

Figure 7A:
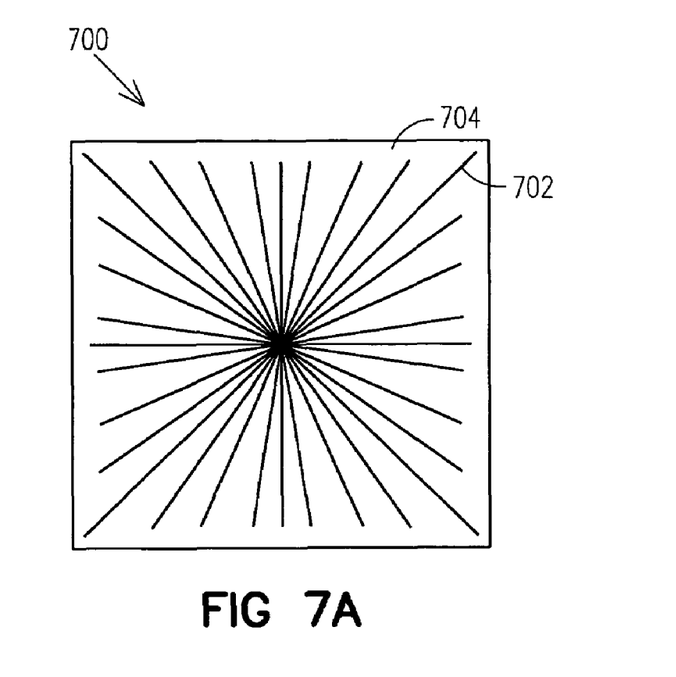
FIG. 7A illustrates another capacitor according to an embodiment of the invention.

FIGS. 7A–7D show embodiments of capacitors using plate assemblies as described above. FIG. 7A shows a capacitor 700, including a plate assembly 702 housed in a capacitor package 704. As shown in FIG. 7A the capacitor package 704 need not be cylindrical in shape to house a fan-like plate assembly. In one embodiment, the capacitor package 704 includes a rectangular shape. Further, individual plates of a plate assembly 702 need not be the same length. In one embodiment, the individual plates of the plate assembly 702 are dimensioned with lengths that fill the available volume of the capacitor package 704. Configurations such as this increase capacitance within a smaller volume.

Figure 7B:
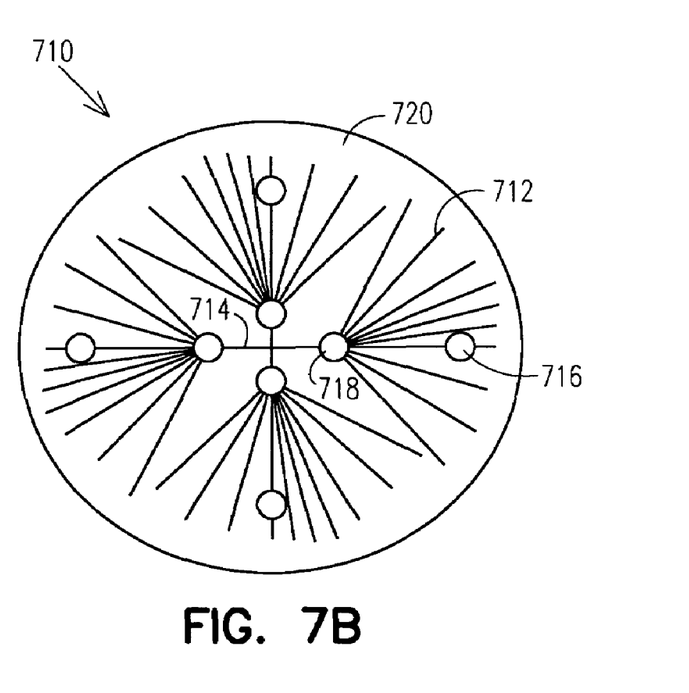
FIG. 7B illustrates another capacitor according to an embodiment of the invention.

FIG. 7B shows a capacitor 710 including a number of plate assemblies 712. Each plate assembly 712 is housed within a capacitor package 720 similar to embodiments described above. In one embodiment, the capacitor package 720 includes a cylindrical capacitor package. In one embodiment, individual plate assemblies 712 are electrically connected using conductors 714 such as wiring, metal traces, etc. A number of first polarity terminals 718 are shown on each of the plate assemblies 712. Likewise, a number of second polarity terminals 716 are shown on each of the plate assemblies 712. In one embodiment, the first polarity terminals are anodes and the second polarity terminals are cathodes, although the invention is not so limited. In one embodiment, the terminals include at least one surface mount terminal. In one embodiment, all terminals are surface mount terminals. The use of multiple terminals in configurations such as FIG. 7B have been shown to reduce ESL and ESR while maintaining high capacitance.

Figure 7C:
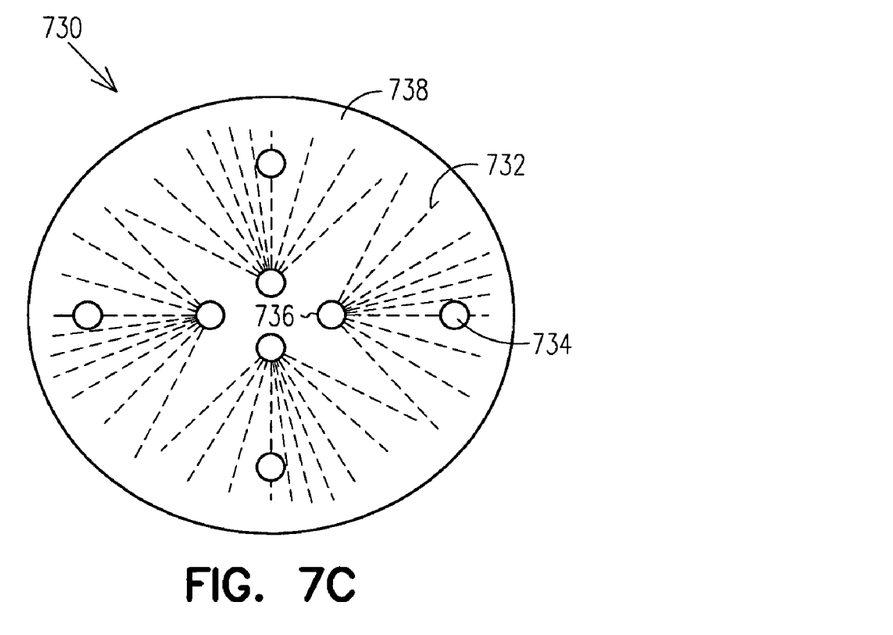
FIG. 7C illustrates another capacitor according to an embodiment of the invention.

FIG. 7C shows a capacitor 730 including a number of plate assemblies 732. Each plate assembly 732 is housed within a capacitor package 738 similar to embodiments described above. In one embodiment, the capacitor package 738 includes a cylindrical capacitor package. In one embodiment, as shown in FIG. 7C, the individual plate assemblies are not electrically connected to each other in the capacitor package 738. This configuration allows the individual plate assemblies to be used individually if desired. This configuration also allows a reduced complexity in manufacturing the capacitor 730. In one embodiment, the plate assemblies 732 are electrically coupled together using traces or other conducting structures on a circuit board. Similar to FIG. 7B, a number of first polarity terminals 736 are shown on each of the plate assemblies 732. Likewise, a number of second polarity terminals 734 are shown on each of the plate assemblies 732. In one embodiment, the first polarity terminals are anodes and the second polarity terminals are cathodes, although the invention is not so limited.

Figure 7D:
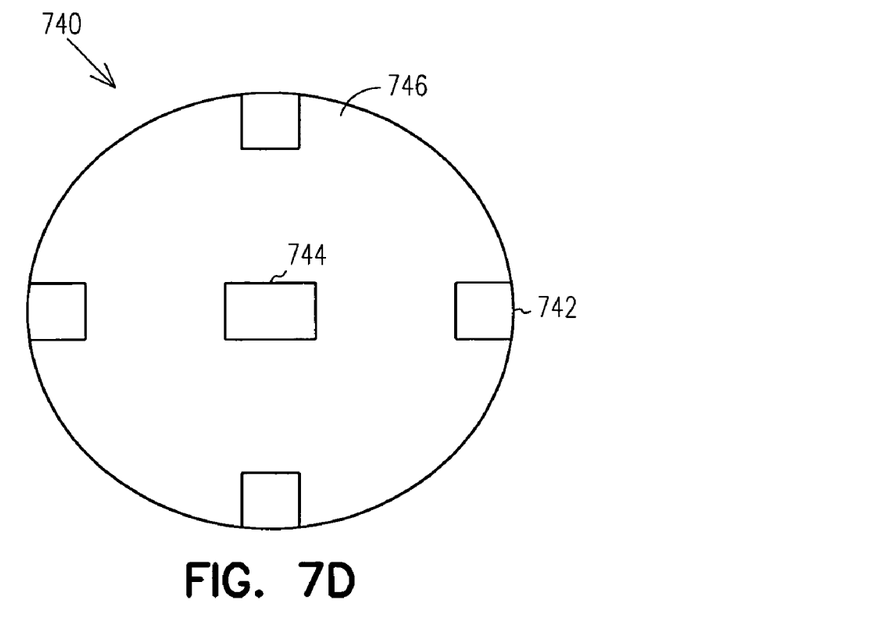
FIG. 7D illustrates another capacitor according to an embodiment of the invention.

FIG. 7D shows a capacitor 740 including a capacitor package 746 and a number of terminals. A first terminal 744 is shown in a center of the capacitor 740 and a number of peripheral terminals 742 are shown. In one embodiment, multiple plate assemblies are coupled to the first terminal 744 at a first polarity connection such as an anode. In one embodiment, each plate assembly is coupled to a selected peripheral terminal 742 at a second polarity connection such as a cathode.

Figure 8A:
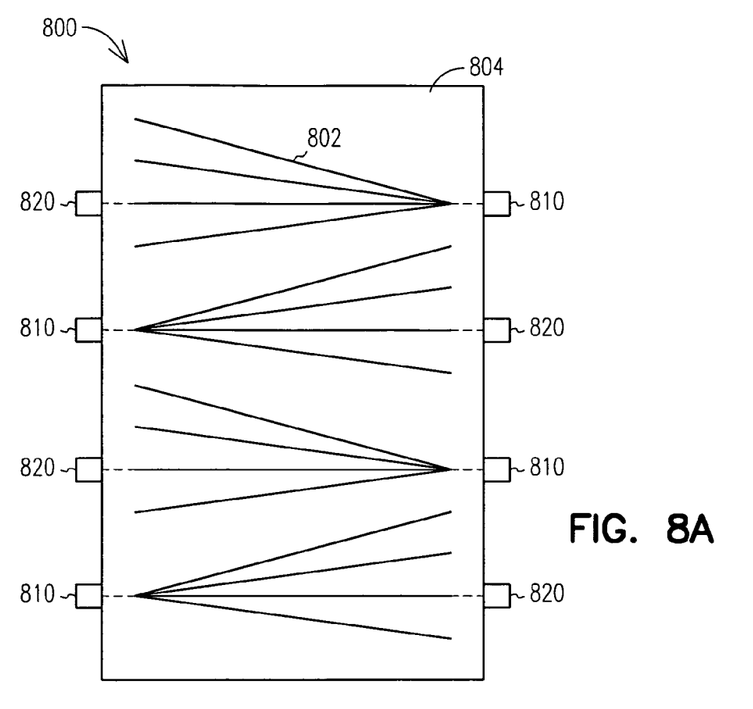
FIG. 8A illustrates another capacitor according to an embodiment of the invention.

FIG. 8A shows a capacitor 800 including a number of plate assemblies 802 housed within a single capacitor package 804. In one embodiment, the plate assemblies include a number of plates as described in embodiments above. In one embodiment, the individual plates include an aluminum foil with a metal oxide dielectric layer and a conductive polymer layer over the dielectric layer. A number of first polarity terminals 810 are shown alternating with a number of second polarity terminals 820. In one embodiment, the first polarity terminals 810 are anodes and the second polarity terminals 820 are cathodes. In one embodiment, at least one plate assembly is oriented with the plates extending vertically with respect to a top of the capacitor package 804.

It has been shown that multiple plate assemblies mounted in this configuration with multiple terminals provides high capacitance with reduced ESL and ESR. In one embodiment, the capacitor package 804 and the arrangement of terminals in the capacitor 800 correspond to existing capacitor form factors for other varieties of capacitors. In one embodiment, the capacitor configuration corresponds to a form factor for a multi layer ceramic capacitor (MLCC). By designing to an existing form factor, it is easy to replace existing capacitor designs with improved capacitors without significantly changing other manufacturing processes.

Figure 8B:
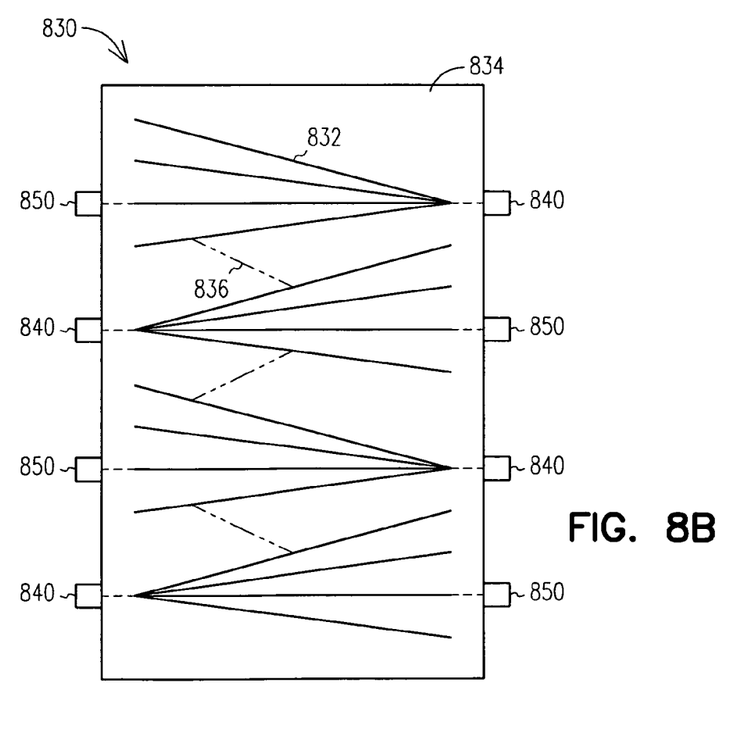
FIG. 8B illustrates another capacitor according to an embodiment of the invention.

FIG. 8B shows a capacitor 830 including a number of plate assemblies 832 housed within a single capacitor package 834. In one embodiment, the plate assemblies include a number of plates as described in embodiments above. In one embodiment, the individual plates include an aluminum foil with a metal oxide dielectric layer and a conductive polymer layer over the dielectric layer. A number of first polarity terminals 840 are shown alternating with a number of second polarity terminals 850. In one embodiment, the first polarity terminals 840 are anodes and the second polarity terminals 850 are cathodes. In one embodiment, at least one plate assembly is oriented with the plates extending vertically with respect to a top of the capacitor package 834. A number of electrically interconnecting structures 836 are included in the capacitor 830 to couple one pole such as a cathode of individual plate assemblies 832. This configuration has been shown to provide high capacitance while reducing ESL and ESR.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of embodiments described above. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A capacitor, comprising:
    a capacitor package;
    a number of plate assemblies housed within the capacitor package, each plate assembly having a first polarity connection and a second polarity connection; and
    a plurality of terminals, wherein multiple first polarity connections are coupled to a single first polarity terminal and corresponding multiple second polarity connections are coupled to multiple second polarity terminals.

2. The capacitor of claim 1, wherein a number of plate assemblies includes a number of fan-like plate assemblies.

3. The capacitor of claim 1, wherein a plurality of terminals includes at least one surface mount terminal.

4. The capacitor of claim 1, wherein the first polarity is an anode and the second polarity is a cathode.

5. The capacitor of claim 1, wherein the capacitor package includes a rectangular volume.

6. An information handling system, comprising:
    a motherboard;
    a voltage regulation circuit coupled to the motherboard, including a capacitor that includes:
        a capacitor package;
        a number of fan-like plate assemblies housed within the capacitor package, each plate assembly having a first polarity connection and a second polarity connection;
        a plurality of terminals, wherein multiple first polarity connections are coupled to a single first polarity terminal and corresponding multiple second polarity connections are coupled to multiple second polarity terminals;
    a processor chip;
    a dynamic random access memory; and
    a bus coupled between the processor chip and the dynamic random access memory.

7. The information handling system of claim 6, wherein the dynamic random access memory includes a synchronous dynamic random access memory.

8. The information handling system of claim 6, wherein the capacitor package includes a cylindrical volume.

9. The information handling system of claim 6, wherein the plurality of terminals includes multiple first polarity terminals.

* * * * *